W. H. McLAUGHLIN.
FASTENING MEANS.
APPLICATION FILED MAR. 26, 1918.
1,276,788.
Patented Aug. 27, 1918.
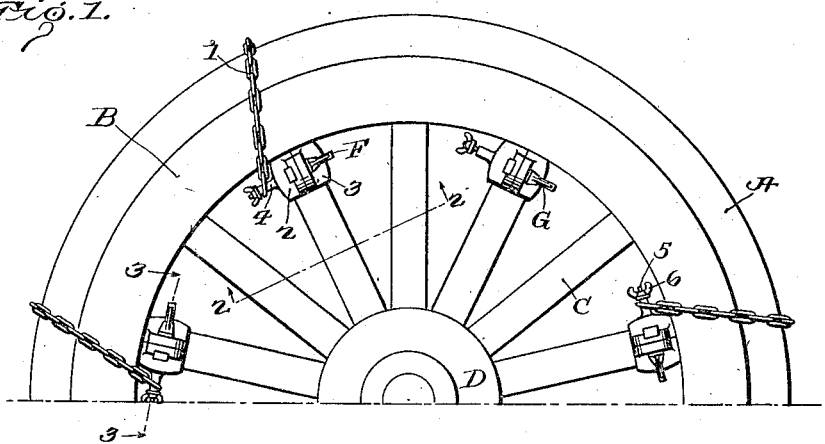
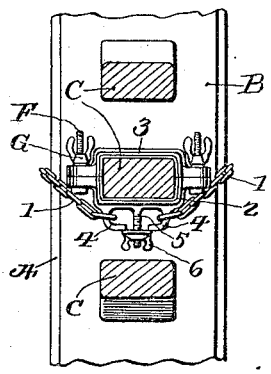
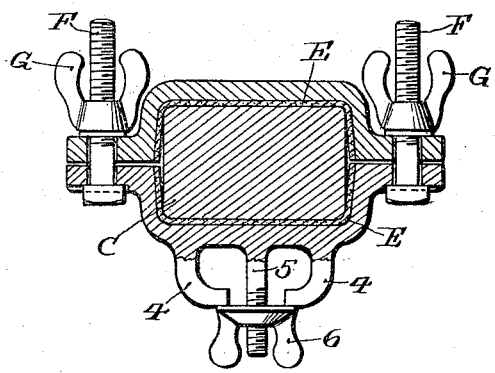
Inventor
William H. McLaughlin.
By W. H. Babcock & Son
Attorneys

UNITED STATES PATENT OFFICE.

WILLIAM H. McLAUGHLIN, OF HARTFORD, CONNECTICUT, ASSIGNOR TO CASSIUS S. CHASE, OF HARTFORD, CONNECTICUT.

FASTENING MEANS.

1,276,788.  Specification of Letters Patent.  Patented Aug. 27, 1918.

Original application filed April 21, 1917, Serial No. 163,727. Divided and this application filed March 26, 1918. Serial No. 224,771.

*To all whom it may concern:*

Be it known that I, WILLIAM H. McLAUGHLIN, a citizen of the United States, residing at Hartford, in the county of Hartford and State of Connecticut, have invented certain new and useful Improvements in Fastening Means, of which the following is a specification.

This application is filed as a division of my application Serial Number 163,727, filed April 21, 1917, for anti-skidding devices.

This invention relates to fastening means or connecting devices intended primarily for use with anti-skidding devices of the fixed point type to be used on vehicle wheels, and more particularly to that class of such devices employing a plate to be fixedly mounted on a part of the wheel, which plate may be one of the plates of a clamp adapted to be applied to the spoke of a wheel as shown.

Heretofore it has been usual to provide a pair of connectors, one for each end of each chain engaging the opposite sides of said means, usually an eye or loop, carried by clamping plates.

The primary object of the present invention is to dispense with all need for these separate connector devices, which are easily lost by reason of their separability, by forming the means carried by the clamping plates in such manner that they will perform the two functions of attaching means or eyes and connectors. A further object is to provide means, devoid of springs or resilient parts, for preventing the escape of the terminal links or eyes of such chains after attachment. Other objects are to brace the attaching hooks, to prevent the terminal links from moving off of their respective hooks or becoming entangled by providing a partition or dividing element between the spaces in the hooks, and to otherwise improve the construction, while reducing the cost of manufacture of such articles, all of which objects are attained by the combination, construction, and arrangement of parts all as hereinafter more particularly set forth, described and claimed.

In the accompanying drawings:

Figure 1 represents a side elevation of a segment of a wheel provided with anti-skidding devices embodying my invention, one of the gripping or anti-skidding chains being omitted;

Fig. 2, a section on line 2—2 of Fig. 1; and

Fig. 3, a section on line 3—3 of Fig. 1, greatly enlarged.

Referring now in detail to the drawings, A designates the tire, B the felly, C the spoke and D the hub.

The front plate 2 is provided with two hooks 4 of sturdy construction preferably cast integral and a screw-threaded stud 5 preferably cast integral with said plate and arranged between the adjacent ends of the hooks 4, which are alined and have their free ends presented toward said stud 5 and spaced therefrom at an interval just sufficient to permit the easy and expeditious fitting of the end or terminal links of the anti-skidding chain 1 on the hooks 4.

When employed in the use primarily in view by applicant the front plate 2 will be used with a complementary plate 3, both of said plates being provided with a rubber treated textile fabric lining E to get a good frictional grip on the surface of the spoke without marring it. Said plates 2 and 3 are provided with perforated integral end flanges which receive the bolts F tightened by means of wing nuts G to hold the clamp plates on the spoke.

A winged nut 6 having an enlarged face or annular flange is adapted to be screwed on the end portion of the stud 5 which projects beyond the front faces of the hooks 4 and is intended to be screwed thereon until its face bears firmly on the forward faces of said hooks, serving in such position to close the gaps or intervals between the ends of said hooks and said stud and at the same time to brace the free ends of said hooks against any strain or twisting action by the chains which might have a tendency to snap these hooks off.

To apply the terminal links of the chain 1 to the hooks 4 it is simply necessary to unscrew the nut 6 sufficiently to allow the passage of the terminal links of said chain 1 between said nut and the ends of hook 4 and then screw said nut 6 on tightly after such application of the links. It is not necessary to completely detach this nut 6 to secure or release the terminal links of the chain 1, though said nut be easily detached by unscrewing in order to be replaced or for any other purpose.

Any suitable material may be used for any part.

Having thus described my invention, what I claim as new and desire to secure by Letters Patent is:

1. A plate having a pair of hooks and a screw-threaded stem projecting from said plate between the free ends of said hooks, in combination with an internally screw-threaded member screwing on the stem and in its extreme rearward position engaging the faces of said hooks.

2. A plate having a pair of hooks and an integral screw-threaded stem projecting from said plate between the free ends of said hooks, in combination with an internally screw-threaded member screwing on the stem and in its extreme rearward position engaging with said hooks.

3. A plate having projections and a screw-threaded stem, in combination with a screw-threaded member screwing on said stem and adapted to engage simultaneously two of such projections.

4. A plate having projections and a stem, in combination with means moving on said stem and having substantially rigid engagement therewith preventing accidental movement thereon, said means being adapted to simultaneously engage two of such projections.

In testimony whereof, I have signed my name to this specification in the presence of a subscribing witness.

WILLIAM H. McLAUGHLIN.

Witness:
SAML. W. COCKRELL.

Copies of this patent may be obtained for five cents each, by addressing the "Commissioner of Patents, Washington, D. C."